3,163,567
PRODUCTION OF DISC-SHAPED NITROCELLULOSE

Charles E. Silk, Alton, Ill., assignor to Olin Mathieson Chemical Corporation, a corporation of Virginia
No Drawing. Filed Apr. 18, 1963, Ser. No. 273,820
17 Claims. (Cl. 149—2)

This invention relates to propellant powder and more particularly to novel disc-like shaped propellant powder particles and their preparation.

Spherical shaped particles of nitrocellulose base propellant have been prepared by well known techniques in which a lacquer of nitrocellulose in a suitable solvent is agitated in a non-solvent medium such as water to form spherical drops of lacquer, and the resulting suspension is then heated to evaporate the solvent from the lacquer, yielding solid spherical shaped nitrocellulose particles suspended in the non-solvent medium. Because of the digressive burning characteristics of spherical shaped particles, efforts have been made to form particles having neutral burning characteristics, such as discs or flakes. In one process the solidified spherical particles are pressed between rollers, generally in the presence of water, to form two substantially parallel flattened sides. This process needs improvement because the many processing steps add to the cost of the process and because the irregular shapes of the particles adversely affect the burning characteristics of the product.

In another process the suspension of nitrocellulose lacquer in the non-solvent medium is subjected to severe agitation, which causes some flattening of the lacquer spheres, and subsequent evaporation of the solvent from the lacquer yields solid disc-like shaped particles. This process is also suitable for the preparation of disc-like shaped nitrocellulose particles, but it has the disadvantage of producing a wide variety of particle sizes, and the product must be subjected to a size separating step in order to obtain particles of substantially uniform size. In still another process a lacquer of nitrocellulose in an organic solvent is extruded through an orifice to form a rod, in the absence of water, and the rod is cut to form discs, which are heated with warm air to remove the solvent. Because of the flammable nature of the solvent and the explosive nature of the nitrocellulose, the process can be hazardous to operating personnel. Up until the discovery of the instant invention, there was no process available to the industry for simply and safely producing, in the presence of water, disc-like shaped nitrocellulose particles of substantially uniform size and density.

It is a primary object of this invention to overcome disadvantages inherent in previously known processes for the preparation of disc-like shaped nitrocellulose particles.

Another object of the invention is to provide an improved process for preparing disc-like shaped particles of nitrocellulose.

Still another object of the invention is to eliminate the rolling step in the preparation of disc-like propellant powder.

It is another object of this invention to provide means for reducing the hazards of fire and explosion in a process for preparing disc-like shaped particles of nitrocellulose.

Still another object of the invention is to provide a process for preparing disc-like nitrocellulose powder directly from a suspension of nitrocellulose-base lacquer in a non-solvent medium.

Another object is to provide novel disc-shaped nitrocellulose particles.

These and other objects of the invention will be apparent from the following detailed description thereof.

It has now been discovered that solid disc-like shaped nitrocellulose particles of substantially uniform size and shape can readily be prepared by a novel process in which a lacquer of suitable viscosity is prepared by dissolving nitrocellulose in a solvent therefore containing emulsified droplets of water, the lacquer is extruded through one or more orifices into an aqueous non-solvent medium to form a lacquer strand at each orifice, each lacquer strand is cut into discs of desired thickness while in contact with the aqueous non-solvent medium, said thickness being substantially less than the diameter of the strand, and the solvent is evaporated in the presence of water from the resulting discs to form solid disc-like shaped particles of nitrocellulose. The diameter of the disc is easily controlled by means of the orifice through which each strand is formed, and the thickness is easily controlled by the rate at which the strand is sliced after passing through the orifice. Because the conventional rolling step and the conventional size separation step are both eliminated, there is a substantial reduction in the cost of preparing the disc-like shaped nitrocellulose particles by this novel technique. In addition fire hazards and explosion hazards are greatly minimized since the nitrocellulose lacquer is in contact with an aqueous medium throughout the entire process.

More in detail, nitrocellulose-base lacquer is prepared by dissolving water-wet nitrocellulose in a volatile solvent therefore. The nitrocellulose may be wholly or partially purified fibrous nitrocellulose in the form of nitrated flakes, linters, or wood pulp; it may be dense colloided nitrocellulose in the form of existing powder, whether fresh or deteriorated, or of good, poor, or indifferent stability; it may be nitrocellulose from other processes such as dust and mud or bulk powder and cannon powder. The nitrocellulose may be of any suitable degree of nitration, such as having a nitrogen content between about 11.0 and about 13.9 percent by weight.

Any volatile solvent for nitrocellulose which has a boiling point below that of water or other non-solvent vehicle and which is substantially immiscible or only partially immiscible with water may be employed in the preparation of the lacquer. Typical examples of suitable solvents of this type include ethyl acetate, methyl ethyl ketone, ethyl formate, isopropyl acetate, diethyl ketone and mixtures thereof.

Sufficient solvent is used to dissolve water-wet nitrocellulose in the preparation of the lacquer to provide a viscosity of between about 12 and about 100, and preferably between about 15 and about 25 seconds, as measured by the following method: a stainless steel rod $5/16$ inch in diameter weighting 60 grams, having a flat end and a circumferential mark $25/16$ inches from the flat end, is placed upon a body of the lacquer flat end down, the temperature of the lacquer being 60° C., and the time required for the rod to sink to the $25/16$ inch depth mark is considered the viscosity of the lacquer. Control of the viscosity of the lacquer is extremely important in obtaining the disc-like shaped particles. When the viscosity is less than about 12 seconds, rounding tends to occur, and the discs of lacquer formed in the non-solvent medium gradually acquire a spherical shape which is retained until after solidification. However, when the viscosity is within the above defined ranges, the surface tension of the resulting discs of lacquer is sufficient for the particles of lacquer to retain their disc-like shape until after solidification. Viscosities higher than 100 seconds may be employed, but high pressure pumps are then necessary to effect extrusion of the lacquer.

Sufficient water should be present in the lacquer to form emulsified droplets of water without forming an additional separate aqueous phase, and yielding a homogeneous dispersion of water droplets in the lacquer. A proportion of water in the range between about 3 percent and about 30 percent by weight of the nitrocellulose in the lacquer has been found to be most efficacious, but other proportions can be employed so long as water is retained as a homogeneous emulsion in the lacquer. The water content of the emulsion may be derived from the water added with the "wet" nitrocellulose, but if sufficient water is not present with the nitrocellulose, additional water may be added separately to provide a water concentration in the lacquer within the above mentioned range.

The lacquer thus prepared is then extruded through at least one suitable orifice, and preferably a multiplicity of orifices, provided with suitable cutting means and a container for the non-solvent medium. Suitable apparatus of this type are disclosed in U.S. Patent No. 2,775,788, issued January 1, 1957, to Eugene A. Andrew, and U.S. Patent No. 3,014,246, issued December 26, 1961, to Ralph L. Cook et al.

The non-solvent medium into which the lacquer is extruded is preferably an aqueous medium saturated with the solvent and containing a protective colloid and/or other additives, described more fully below. Addition of the solvent to the water prior to extrusion and cutting of the lacquer strands prevents precipitation of nitrocellulose gel due to extraction of the solvent from the discs by the water.

Other materials may be added to the lacquer or non-solvent medium prior to or during the extrusion and cutting of the lacquer. A suitable protective colloid such as corn starch, gum arabic, animal bone glue, dextrin, bentonite, or the like, is added to the non-solvent medium prior to extrusion of the lacquer in a proportion equivalent to between about 0.2 and about 1.0 percent by weight of the water present in the mixture. High energy compounds such as triethylene glycol dinitrate, pentaerythritol trinitrate and nitroglycerin may be added with the lacquer in a proportion up to about 50 percent by weight of the nitrocellulose in order to increase the burning rate of the solid powder particles ultimately produced.

An important feature of the process of this invention is that close control of the specific gravity of the final disc-like nitrocellulose particles can be obtained. When it is desired to obtain solid discs having a specific gravity from as low as about 0.6 up to about 1.1, a specific gravity decreasing proportion of a water soluble metal salt is dissolved in the water emulsion contained in the lacquer, prior to extrusion. The proportion of water soluble metal salt which yields a product having a specific gravity in this range is usually between about 0.01 and about 5 percent by weight of the nitrocellulose contained in the lacquer when the water content of the lacquer is about 20 percent by weight of the nitrocellulose, the higher the concentration of metal salt in the lacquer the lower the specific gravity of the product. Suitable water soluble metal salts include sodium sulfate, potassium sulfate, sodium nitrate, potassium nitrate, magnesium nitrate, barium nitrate, and the like and mixtures thereof. While I do not wish to be bound by theory, it is believed that when the water soluble metal salt is added to the water emulsion of the lacquer in this manner, the salt-bearing water emulsion is retained in the lacquer throughout the extrusion, cutting, and distillation steps, and is finally removed in the drying step, thus yielding porous discs having a low specific gravity and desirable burning characteristics. When an excessive amount of water soluble metal salt, generally greater than about 5 percent by weight of the nitrocellulose in the lacquer is employed and the water content is 20 percent, the resulting discs are highly porous and are generally too fragile to retain their shape during conventional handling and packing steps.

When no water soluble metal salt is employed the product generally has a specific gravity in the range of between about 1.1 to about 1.2 when the water concentration is about 20 percent by weight of the nitrocellulose. When a product having a specific gravity of between about 1.2 up to about 1.6 is desired, the water soluble metal salt is added to the non-solvent aqueous medium in a proportion equivalent to between about 0.25 and about 5 percent by weight of the water present in the aqueous medium. The water soluble metal salt is added to the non-aqueous medium either prior to the cutting of the extruded lacquer rods into discs or prior to distillation of the solvent from the discs.

The specific gravities of the products corresponding to the above mentioned proportions of water soluble metal salts is intended to be illustrative and not limiting since specific gravity of the product depends also on the amount of water in the lacquer as well as the amount of metal salt added and whether the salt is added to the water in the lacquer or to the non-solvent aqueous medium. For example when greater than 20 percent water is present in the lacquer and the metal salt is added to the water in the lacquer, a lower specific gravity of the resulting solid product is obtained for a given proportion of metal salt and when less than 20 percent water is used a higher specific gravity is obtained for the same proportion of salt.

If desired, other materials, for example, stabilizers such as diphenyl amine, 2-nitrodiphenyl amine, ethyl centralite, and the like; deterrents such as dinitrotoluene, dibutyl phthalate, diphenyl phthalate, ethyl centralite and the like; and other modifying agents such as lead compounds, carbon black, powdered aluminum, and the like, may be included in the lacquer prior to formation of the discs.

In addition, other substances which are volatile non-solvents for nitrocellulose, and which are miscible with the volatile solvent for nitrocellulose and immiscible with water may be added as a diluent. Typical examples of suitable diluents include the liquid hydrocarbons, xylene, benzene, pentane, hexane, heptane, octane, nonane, decane, undecane, dodecane, and other compatible water-immiscible diluents such as isopropyl ether, propyl ether, cyclohexane, methyl cyclohexane, toluene, and the like.

It is particularly desirable to use such diluents when an effort is being made to prepare disc-like powder particles of high gravimetric density of the type used in center fire ammunition since these diluents inhibit warping of the discs.

After a lacquer having a viscosity within the above defined ranges is prepared, it is conveyed under suitable pressure, such as that provided by a positive displacement pump, to a mechanical grainer, for example, of the type described in the above-mentioned Andrew patent or Cook et al. patent. The diameter of the orifices in the chamber may be of any suitable uniform size, for example, within the range between about 0.030 and about 0.10 inch. Pressure imparted to the lacquer forces it through the orifices in the chamber containing the non-solvent medium yielding strands or rods of lacquer of a diameter corresponding to that of the orifices. The cutter is rotated at a speed suitable to cut the rods into discs of any desired thickness, for example to a thickness or web between about 0.004 and about 0.030 inch. The diameter of the disc should exceed the web of the disc.

As the discs of lacquer are produced they are suspended in the non-solvent medium contained in the enclosing vessel or graining chamber surrounding the cutter. It is preferred that agitation for suspending the lacquer discs in non-solvent medium be only that provided by the cutter blades in order to reduce the possibility of producing fines resulting from breaking of the discs of lacquer. The temperature and pressure of the lacquer and the resulting suspension of lacquer discs is adjusted to prevent premature evaporation of the solvent. At atmospheric pressure, a temperature between about 60 and about 65° C. may be employed without significant evaporation of the solvent. Temperatures above 65° C. may be employed when the system is under sufficient pressure to prevent evaporation.

Further processing of the suspension of lacquer discs in the non-solvent medium may be effected by one of several techniques. In one embodiment the suspension is retained in the enclosing vessel until all of the lacquer discs have been formed, and this suspension, in a batchwise manner, is then heated to effect evaporation of the solvent from the lacquer discs, thereby yielding solidified disc-like shaped particles of nitrocellulose. If desired, this evaporation step can be carried out by conveying the suspension from the enclosing vessel to a separate evaporation vessel. In another embodiment non-solvent medium is continuously conveyed to the enclosing vessel to suspend lacquer discs as they are formed, and the resulting suspension is continuously withdrawn from the enclosing vessel and conveyed to a suitable evaporation vessel where the lacquer discs are solidified by evaporation of the solvent therefrom. After solidification of the nitrocellulose discs by any of these embodiments, the solid discs may be separated from the non-solvent medium by any suitable solid-liquid separation technique, such as by filtration, decanting, or the like. The moist solids are then dried and may be glazed if desired. In addition the solids may be surface coated with any of the above-mentioned deterrents or modifiers. If desired the above-mentioned deterrents or modifiers may be added to the suspension of solids immediately after distillation of the solvent or in a separate aqueous suspension, or added to the dried powder in a heated tumbling barrel to effect surface coating.

The dry product is of very uniform particle size and no size separation step is required to yield a product suitable for use in shot shells, small arms ammunition and artillery ammunition. Each nitrocellulose particle has a circular circumference and is in the form of a right cylinder. In addition the particles are very rigid and resist degradation and breaking when subjected to severe handling conditions. The disc-like shaped nitrocellulose particles of this invention are generally characterized by shiny surfaces as opposed to the relatively dull finish of conventional disc or flake powder. Furthermore, the novel disc-like shaped nitrocellulose particles of this invention have more uniform ballistic properties at temperatures below atmospheric temperature. For example when cartridges containing the disc-like shaped particles of this invention are stored at temperatures of −40° F., there is no significant change in the pressure or the velocity upon firing as compared to firing at atmospheric temperatures. In contrast when conventional flake nitrocellulose and rolled nitrocellulose discs were stored at this temperature and then fired, there was a substantial reduction in the pressure and velocity.

In order to illustrate the invention more fully without any intention of being limited thereby, the following examples are presented. All parts and percentages are by weight unless otherwise specified.

EXAMPLE I

A nitrocellulose lacquer was prepared by admixing 10 parts of wet nitrocellulose with 0.085 part of potassium nitrate dissolved in water, 18 parts of ethyl acetate containing 0.1 part of dissolved diphenylamine, and 2 parts of nitroglycerin mixed with 2 parts of ethylacetate. These ingredients were admixed at a temperature of about 60° C. until a homogeneous lacquer was formed. The viscosity of the resulting lacquer, as determined by the falling rod technique described above, was adjusted to about 20 to 25 seconds by the removal of solvent. The lacquer was placed in a sealed vessel under a pressure of about 10 p.s.i.g. and was then pumped by means of a positive displacement pump to a mechanical grainer of a type similar to that described in U.S. Patent No. 3,014,246. The orifices in the chamber had a diameter of about 0.055 inch and the blade was rotated at a rate sufficient to cut the lacquer into discs having a thickness of about 0.01 inch.

A non-solvent liquor was prepared having the following composition.

| Components: | Parts |
|---|---|
| Water | 70 |
| Animal bone glue | 14 |
| Ethylacetate | 15 |
| Nitroglycerin | 1 |

The non-solvent lacquer was pumped continuously to the enclosing vessel of the mechanical grainer and a suspension of the lacquer discs in the non-solvent liquor was continuously withdrawn and conveyed to a heated, agitated evaporation vessel where the solvent was distilled from the lacquer at a temperature of 99° C.

The resulting slurry of solid disc-like shaped nitrocellulose particles in the non-solvent medium was filtered and the wet nitrocellulose particles were heated to dryness. Substantially all of the particles had a web of about 0.008 inch. The product had a specific gravity of about 1.0 and a packing density of about 0.35 gram per cc.

EXAMPLE II

The procedure of Example I was repeated with the exception that water-wet new nitrocellulose having a 13.2 percent nitrogen content was used as the nitrocellulose source, the potassium nitrate was omitted, and the lacquer discs were cut to a 0.005 inch thickness. The product had a web of about 0.0065 inch and a specific gravity of 1.30.

EXAMPLE III

The procedure of Example I was repeated with the exception that no potassium nitrate was added in the lacquer makeup, and sodium sulfate was added as a dewatering salt to the liquor. The product had a web of about 0.0045 inch and a specific gravity of 1.57.

EXAMPLE IV

Employing the equipment of Example I, 10 parts of wrung nitrocellulose blended to a 13.2 percent nitrogen content were admixed with 0.1 part of chalk and 18 parts of solvent which was composed of 3 parts of toluene to each 7 parts of ethyl acetate in which 0.1 part of diphenylamine had been dissolved. These ingredients were heated with agitation to a temperature of 60° C. and the viscosity was adjusted to about 12 seconds using the falling rod technique. The resulting lacquer was then processed as in Example I. The product was comprised of essentially flat grains, each having a web of about 0.009 inch and a specific gravity of about 1.56. The packing density was about 0.85 gram per cc.

EXAMPLE V

Three batches of disc-like shaped nitrocellulose particles were prepared as in Example III. These products which were identified as powder A, B, and C, respectively, were blended in equal weight proportions. The characteristics of each powder and the resulting blend are as follows:

| Powder | Web, Inches | Gravimetric, Density, g./cc | Specific Gravity |
|---|---|---|---|
| A | .010 | .660 | 1.58 |
| B | .0076 | .629 | 1.58 |
| C | .006 | .664 | 1.59 |
| Blend | .0073 | .656 | 1.57 |

The blend was used to prepare twenty shotgun cartridges of 2¾ inches long, 16 gauge, Super X, 1⅛ ounce load. Ten of the cartridges were fired at room temperature and ten of the cartridges were fired after being stored for 16 hours at −40° F. The average pressure and the average velocity were determined and the results are presented in the table below. For purposes of comparison 20 cartridges containing conventional flake nitrocellulose and 20 cartridges containing disc shaped nitrocellulose formed by rolling nitrocellulose spheres were tested in the same manner and the results are presented in the table below.

Table 1

| Powder | Temperature | Charge, Grains | Pressure, p.s.i. | Velocity, ft./sec. | ΔP, p.s.i. | ΔV, ft./sec. |
|---|---|---|---|---|---|---|
| Blend | Normal | 26.5 | 9,600 | 1,311 | +8 | −42 |
|  | −40° F | 26.5 | 10,400 | 1,269 |  |  |
| Rolled | Normal | 28.5 | 10,100 | 1,299 | −22 | −127 |
|  | −40° F | 28.5 | 7,900 | 1,172 |  |  |
| Flake | Normal | 26.0 | 9,400 | 1,298 | −27 | −97 |
|  | −40° F | 26.0 | 6,700 | 1,201 |  |  |

From the table it can be seen that there was no significant change in the pressure or velocity obtained by firing the blend produced in accordance with this invention after being stored at −40° F. for 16 hours. In contrast there was a marked reduction in the pressure and velocity obtained by firing conventional rolled and flaked powder stored at −40° F. under the same conditions.

In carrying out the process of this invention, the nitrocellulose component is in contact with water through the entire process. As a result the danger of unexpected explosion of the nitrocellulose is virtually eliminated. In marked contrast the nitrocellulose component in the conventional extrusion process is in contact with only organic solvents during certain steps of the process, and as a result extensive safety precautions must be employed in order to prevent serious unexpected explosions during the extrusion process.

Various modifications of the invention may be imparted without departing from the spirit of the invention. What is desired to be secured by Letters Patent is:

1. A process for preparing disc-like powder particles which comprise dissolving water wet nitrocellulose in a solvent therefore to form a lacquer having a viscosity of between about 12 and about 100 seconds, at 60° C., extruding the lacquer through at least one orifice into an aqueous non-solvent medium, cutting disc-like shaped sections from the extruded lacquer as it emerges from the orifice while in contact with the non-solvent medium to form a suspension of lacquer sections in the non-solvent medium, heating the resulting suspension to evaporate said solvent from said sections while retaining their disc-like shape and separating the resulting solid disc-like shaped particles of nitrocellulose from the suspension.

2. The process of claim 1 wherein the temperature of said lacquer and said non-solvent medium is maintained in the range between about 60 and about 65° C. during the formation of said lacquer sections.

3. The process of claim 1 wherein said solvent is ethyl acetate.

4. Disc-like shaped particles of nitrocellulose produced by the process of claim 1.

5. A process for preparing disc-like shaped particles of nitrocellulose which comprises dissolving water-wet nitrocellulose in a solvent therefore, adding to the resulting solution sufficient aqueous solution of a water soluble metal salt to provide a specific gravity reducing proportion of said metal salt, the total weight of water added to said solvent being up to about 30 percent by weight of the nitrocellulose, admixing these ingredients in sufficient proportions to yield a lacquer having a viscosity at 60° C. of between about 12 and about 100 seconds, pressing the lacquer through at least one orifice into an aqueous non-solvent medium, cutting disc-like shaped sections from the lacquer strands emerging from the orifice while the strand is in contact with the non-solvent medium to form a suspension of lacquer sections in the non-solvent medium, heating the resulting suspension to evaporate said solvent from said sections while retaining their disc-like shape, separating the resulting solid disc-like shaped particles of nitrocellulose from the suspension and heating the solid disc-like shaped nitrocellulose to dryness.

6. The process of claim 5 wherein said solvent is ethyl acetate.

7. The process of claim 5 wherein the temperature of said lacquer and said non-solvent medium is maintained in the range between about 60 and about 65° C. during the formation of said lacquer sections.

8. The process of claim 5 wherein said water soluble metal salt is potassium sulfate.

9. The process of claim 5 wherein said water soluble metal salt is potassium nitrate.

10. The process of claim 5 wherein said water soluble metal salt is sodium sulfate.

11. Disc-like shaped particles of nitrocellulose produced by the process of claim 5.

12. A process for preparing disc-like shaped particles of nitrocellulose which comprises dissolving weter-wet nitrocellulose in ethyl acetate, adding to the resulting solution sufficient aqueous solution of potassium nitrate to provide potassium nitrate in an amount equivalent to between about 0.01 and about 5 percent by weight of the nitrocellulose, the weight of water added to the ethyl acetate being up to about 30 percent by weight of the nitrocellulose, admixing these ingredients in sufficient proportions to yield a lacquer having a viscosity at 60° C. of between about 12 and about 100 seconds, pressing the lacquer through at least one orifice into an aqueous non-solvent medium containing water and up to about 1 percent by weight of a protective colloid based upon the weight of the water present in the aqueous non-solvent medium, maintaining the temperature of said lacquer and said non-solvent medium in the range of between about 60 and about 65° C., cutting disc-like shaped sections from the pressed lacquer as it emerges from the orifice while in contact with the non-solvent medium to form a suspension of lacquer sections in the non-solvent medium, heating the resulting suspension to evaporate ethyl acetate from said sections while retaining their disc-like shape, separating the resulting solid disc-like shaped particles of nitrocellulose from the suspension, and heating said solid disc-like shaped particles to dryness.

13. Disc-like shaped particles of nitrocellulose produced by the process of claim 12.

14. A process for preparing disc-like shaped particles of nitrocellulose which comprises dissolving water-wet nitrocellulose in ethyl acetate, adding to the resulting solution sufficient aqueous solution of sodium sulfate to provide sodium sulfate in an amount equivalent to between about 0.01 and about 5 percent by weight of the nitrocellulose, the weight of water added to the ethyl acetate being up to about 30 percent by weight of the nitrocellulose, admixing these ingredients in sufficient proportions to yield a lacquer having a viscosity at 60° C. of between about 12 and about 100 seconds, pressing the lacquer through at least one orifice into an aqueous non-solvent medium containing water and up to about 1 percent by weight of a protective colloid based upon the weight of the water present in the aqueous non-solvent medium, maintaining the temperature of said lacquer and said non-solvent medium in the range of between about 60 and about 65° C., cutting disc-like shaped sections from the pressed lacquer as it emerges from the orifice when in contact with the non-solvent medium to form a suspension of lacquer sections in the non-solvent medium, heating the resulting suspension to evaporate ethyl acetate from said sections while retaining their disc-like shape, separating the resulting solid disc-like shaped particles of nitrocellulose from the suspension, and heating said solid disc-like shaped particles to dryness.

15. Disc-like shaped particles of nitrocellulose produced by the process of claim 14.

16. A process for preparing disc-like shaped particles of nitrocellulose which comprises dissolving water-wet nitrocellulose in ethyl acetate, adding to the resulting solution sufficient aqueous solution of potassium sulfate to provide potassium sulfate in an amount equivalent to between about 0.01 and about 5 percent by weight of the nitrocellulose, the weight of water added to the ethyl acetate being up to about 30 percent by weight of the nitrocellulose, admixing these ingredients in sufficient proportions to yield a lacquer having a viscosity at 60° C. of between about 12 and 100 seconds, pressing the lacquer through at least one orifice into an aqueous non-solvent medium containing water and up to about 1 percent by weight of a protective colloid based upon the weight of the water present in the aqueous non-solvent medium, maintaining the temperature of said lacquer and said non-solvent medium in the range of between about 60 and about 65° C., cutting disc-like shaped sections from the pressed lacquer as it emerges from the orifice when in contact with the non-solvent medium to form a suspension of lacquer sections in the non-solvent medium, heating the resulting suspension to evaporate ethyl acetate from said sections while retaining their disc-like shape, separating the resulting solid disc-like shaped particles of nitrocellulose from the suspension, and heating said solid disc-like shaped particles to dryness.

17. Disc-like shaped particles of nitrocellulose produced by the process of claim 16.

References Cited by the Examiner
UNITED STATES PATENTS

| | | | |
|---|---|---|---|
| 2,740,705 | 4/56 | O'Neill | 149—2 |
| 3,014,246 | 12/61 | Cook et al. | 260—223 X |

CARL D. QUARFORTH, *Primary Examiner.*